(12) United States Patent
Zhang et al.

(10) Patent No.: US 9,300,940 B2
(45) Date of Patent: Mar. 29, 2016

(54) METHOD AND APPARATUS FOR CONVERTING 2-DIMENSIONAL IMAGE INTO 3-DIMENSIONAL IMAGE BY ADJUSTING DEPTH OF THE 3-DIMENSIONAL IMAGE

(75) Inventors: Lei Zhang, Suwon-si (KR); Young-wook Sohn, Yongin-si (KR); Oh-jae Kwon, Suwon-si (KR); Jong-sul Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 13/225,001

(22) Filed: Sep. 2, 2011

(65) Prior Publication Data

US 2012/0056984 A1 Mar. 8, 2012

(30) Foreign Application Priority Data

Sep. 3, 2010 (KR) .................. 10-2010-0086582

(51) Int. Cl.
*H04N 13/00* (2006.01)

(52) U.S. Cl.
CPC .... *H04N 13/0022* (2013.01); *H04N 2013/0081* (2013.01)

(58) Field of Classification Search
CPC .................. H04N 13/0022; H04N 2013/0081
USPC .................... 348/43; 382/154, 277, 285, 302; 345/419
See application file for complete search history.

(56) References Cited

U.S. PATENT DOCUMENTS

| | | | | |
|---|---|---|---|---|
| 7,440,590 | B1* | 10/2008 | Hassebrook et al. | 382/108 |
| 2007/0018977 | A1* | 1/2007 | Niem et al. | 345/422 |
| 2008/0150945 | A1* | 6/2008 | Wang et al. | 345/427 |
| 2010/0141757 | A1* | 6/2010 | Baik et al. | 348/135 |
| 2010/0296746 | A1* | 11/2010 | Strom et al. | 382/233 |
| 2011/0032338 | A1* | 2/2011 | Raveendran et al. | 348/51 |
| 2011/0096832 | A1* | 4/2011 | Zhang et al. | 375/240.08 |
| 2011/0141237 | A1* | 6/2011 | Cheng et al. | 348/46 |
| 2011/0169818 | A1* | 7/2011 | Pan et al. | 345/419 |
| 2012/0007950 | A1* | 1/2012 | Yang et al. | 348/43 |
| 2012/0051625 | A1* | 3/2012 | Appia et al. | 382/154 |
| 2012/0274626 | A1* | 11/2012 | Hsieh | 345/419 |
| 2012/0293615 | A1* | 11/2012 | Chen et al. | 348/43 |
| 2013/0070050 | A1* | 3/2013 | Ha et al. | 348/43 |
| 2013/0169749 | A1* | 7/2013 | Zhou et al. | 348/43 |

* cited by examiner

*Primary Examiner* — Gims Philippe
*Assistant Examiner* — Benjamin Pezzner
(74) *Attorney, Agent, or Firm* — Sughrue Mion, PLLC (57) ABSTRACT

Provided are an apparatus and method for converting a two-dimensional (2D) image into a three-dimensional (3D) image. The method includes generating a first depth map by estimating depth information of an input image, wherein the input image is a 2D image; analyzing characteristics of the input image; predicting an error of the first depth map; determining a parameter for adjusting the first depth map based on the analyzed characteristics of the input image and the predicted error of the first depth map; adjusting the first depth map based on the determined parameter; and generating a 3D image of the input image based on the adjusted first depth map.

20 Claims, 4 Drawing Sheets

METHOD AND APPARATUS FOR CONVERTING 2-DIMENSIONAL IMAGE INTO 3-DIMENSIONAL IMAGE BY ADJUSTING DEPTH OF THE 3-DIMENSIONAL IMAGE

CROSS-REFERENCE TO RELATED PATENT APPLICATION

This application claims priority from Korean Patent Application No. 10-2010-0086582, filed on Sep. 3, 2010, in the Korean Intellectual Property Office, the disclosure of which is incorporated herein by reference in its entirety.

BACKGROUND

1. Field

Apparatuses and methods consistent with exemplary embodiments relate to conversion of a two-dimensional (2D) image into a three-dimensional (3D) image to generate 3D video content.

2. Description of the Related Art

As 3D video reproduction technologies are commercialized, 3D video contents are highly demanded. In addition to 3D video contents obtained by content providers by using 3D video capturing devices, 3D video contents obtained by converting a 2D video into a 3D video are provided.

Techniques for converting a 2D video into a 3D video include a technique using a difference in depth between left-view and right-view images of a stereoscopic image. In this case, a 2D video may be converted into a 3D video by sequentially performing depth estimation and depth rendering on the 2D video.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a method of converting an image, the method including: generating a first depth map by estimating depth information of an input image, wherein the input image is a 2D image; analyzing characteristics of the input image; predicting an error of the first depth map; determining a parameter for adjusting the first depth map based on the analyzed characteristics of the input image and the predicted error of the first depth map; adjusting the first depth map based on the determined parameter; and generating a 3D image of the input image based on the adjusted first depth map.

The method may further include generating a second depth map of the input image based on the adjusted first depth map, wherein the generating of the 3D image of the input image comprises generating a stereoscopic image of the input image using the second depth map.

The analyzing of the characteristics of the input image may include analyzing at least one of a spatial structure, a temporal structure and a spatio-temporal complexity of the input image.

The analyzing of the characteristics of the input image may include analyzing at least one of color characteristics, contrast characteristics and edge characteristics of the input image.

The predicting of the error of the first depth map may include predicting an error in the first depth map based on the characteristics of the input image.

The determining of the parameter for adjusting the first depth map may include: determining at least one analytic parameter based on the at least one of the analyzed spatial structure, the temporal structure and the spatio-temporal complexity of the input image; determining an error prediction parameter based on the predicted error of the first depth map; and obtaining an error control parameter by combining the analytic parameter and the error prediction parameter.

The determining of the parameter for adjusting the first depth map may further include determining an ultimate control parameter for adjusting the first depth map, wherein the ultimate control parameter is determined by combining the error control parameter and an initial parameter based on characteristics of the first depth map.

The method may include a control parameter having at least one of the analytic parameter, the error prediction parameter, the error control parameter and the ultimate control parameter, and has a value for adjusting at least one of a depth value, an image focus and a depth range of the first depth map.

The obtaining of the error control parameter may include: determining weights for the analytic parameter and the error prediction parameter; and obtaining the error control parameter by calculating a weighted sum of the analytic parameter and the error prediction parameter using the determined weights.

The determining of the ultimate control parameter may include: determining weights for the initial parameter and the error control parameter; obtaining the error control parameter by calculating a weighted sum of the initial parameter and the error control parameter using the determined weights.

The analyzing of the characteristics of the input image may include: determining a depth map model of the input image; and determining a similarity between the depth map model and the input image by analyzing the characteristics of the input image, and wherein the predicting of the error of the first depth map includes predicting the error of the first depth map based on the similarity.

The determining of the similarity between the depth map model and the input image may include: estimating similarities between the first depth map of the input image and a plurality of depth map models included in a depth map model group and determining a first depth map model having a highest similarity from among the depth map model group; and determining the parameter based on a similarity between the first depth map model and the input image.

The analyzing of the characteristics of the input image may further include determining a weight for at least one of the depth map model and the first depth map based on the determined parameter, and wherein the generating of the second depth map comprises calculating a weighted sum of the depth map model and the first depth map based on the determined weight.

The analyzing of the characteristics of the input image may include: estimating similarities between the first depth map of the input image and a plurality of depth map models included in a depth map model group; determining a predetermined number of depth map models in an order of a high similarity to the input image; and determining the predetermined number of parameters based on the similarities between the predetermined number of depth map models and the input image, wherein the generating of the second depth map comprises adjusting the first depth map based on the predetermined number of determined parameters based on the predetermined number of determined depth map models.

According to an aspect of another exemplary embodiment, there is provided an apparatus for converting an image, the apparatus including: a first depth map generation unit which generates a first depth map by estimating depth information of an input image, wherein the input image is a 2D image; an image characteristic analysis unit which analyzes characteristics of the input image, predicts an error of the first depth map, and determines a parameter for adjusting the first depth map, based on the analyzed characteristics of the input image and the predicted error of the first depth map; a depth map adjustment unit which adjusts the first depth map based on the determined parameter; and a 3D image generation unit which generates a 3D image of the input image based on the adjusted first depth map.

The image characteristic analysis unit may analyze at least one of a spatial structure, a temporal structure and a spatio-temporal complexity of the input image, and may predict an error in the first depth map based on the characteristics of the input image.

The image characteristic analysis unit may determine at least one analytic parameter based on the at least one of the analyzed spatial structure, the temporal structure, and the spatio-temporal complexity of the input image, determines an error prediction parameter based on the predicted error of the first depth map, obtains an error control parameter by combining the analytic parameter and the error prediction parameter and determines an ultimate control parameter for adjusting the first depth map by combining the error control parameter and an initial parameter based on characteristics of the first depth map.

The image characteristic analysis unit may determine weights for the analytic parameter and the error prediction parameter, obtains the error control parameter by calculating a weighted sum of the analytic parameter and the error prediction parameter using the determined weights, determines weights for the initial parameter and the error control parameter and obtains the error control parameter by calculating a weighted sum of the initial parameter and the error control parameter using the determined weights.

The depth map adjustment unit may include a second depth map generation unit which generates a second depth map of the input image by adjusting the first depth map based on the determined parameter and the 3D image generation unit may generate and reproduce the 3D image of the input image using the second depth map.

The image characteristic analysis unit may determine a depth map model of the input image, may determine a similarity between the depth map model and the input image by analyzing the characteristics of the input image, and may predict the error of the first depth map based on the similarity between the depth map model and the input image.

The image characteristic analysis unit may estimate similarities between the first depth map of the input image and a plurality of depth map models included in a depth map model group, may determine a first depth map model having a highest similarity from among the depth map model group and may determine the parameter based on a similarity between the first depth map model and the input image, and the second depth map generation unit may determine weights for the first depth map model and the first depth map based on the determined parameter and generates the second depth map by calculating a weighted sum of the first depth map model and the first depth map based on the determined weights.

According to an aspect of another exemplary embodiment, there is provided a computer readable recording medium having recorded thereon a computer program for executing a method of converting an image, the method including: generating a first depth map by estimating depth information of an input image, wherein the input image is a 2D image; analyzing characteristics of the input image; predicting an error of the first depth map; determining a parameter for adjusting the first depth map based on the analyzed characteristics of the input image and the predicted error of the first depth map; adjusting the first depth map based on the determined parameter; and generating a 3D image of the input image based on the adjusted first depth map.

BRIEF DESCRIPTION OF THE DRAWINGS

The above and other aspects will become more apparent by describing in detail exemplary embodiments with reference to the attached drawings in which.

DETAILED DESCRIPTION

Hereinafter, exemplary embodiments will be described in detail with reference to the attached drawings. In the following specification, an 'image' may refer to a moving image, e.g., a video, as well as a still image. The still image may be one of a plurality of still images for forming the video. The term "unit" as used herein means a hardware component and/or a software component that is executed by a hardware component such as a processor.

Figure 1A:
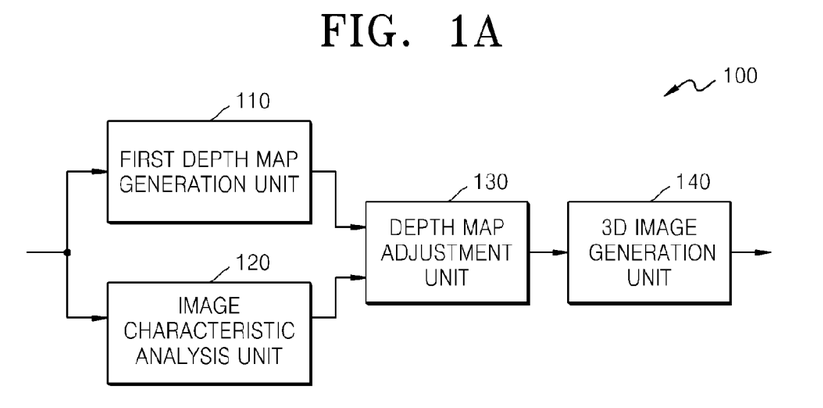
FIG. 1A is a block diagram of an apparatus for converting an image, according to an exemplary embodiment.

FIG. 1A is a block diagram of an apparatus 100 for converting an image, according to an exemplary embodiment.

The apparatus 100 includes a first depth map generation unit 110, an image characteristic analysis unit 120, a depth map adjustment unit 130, and a 3-dimensional (3D) image generation unit 140.

The first depth map generation unit 110 receives a 2D image as an input image and generates a first depth map by estimating depth information of the input image. The first depth map may be an original depth map estimated on the 2D image.

The image characteristic analysis unit 120 receives the input image and analyzes characteristics of the input image. The image characteristic analysis unit 120 may analyze at least one of a spatial structure, a temporal structure, and a spatio-temporal complexity of the input image. The image characteristic analysis unit 120 may extract at least one of color characteristics, contrast characteristics, and edge characteristics of the input image as the characteristics of the input image.

Also, the image characteristic analysis unit 120 predicts an error of the first depth map. The image characteristic analysis unit 120 may predict an error that possibly occurs in the first depth map, based on the analyzed characteristics of the input image.

A method of adjusting the first depth map based on the error of the first depth map, which is predicted by the image characteristic analysis unit 120, includes a first method of directly adjusting a parameter for adjusting the first depth map, and a second method of adjusting the first depth map by combining a depth map model and the first depth map.

If the image characteristic analysis unit 120 uses the first method of directly adjusting a parameter for adjusting the first depth map, the image characteristic analysis unit 120 may determine the parameter for adjusting the first depth map, based on the characteristics of the input image and the predicted error of the first depth map. The image characteristic analysis unit 120 may determine at least one analytic parameter based on at least one of the analyzed spatial structure, the temporal structure, and the spatio-temporal complexity of the input image, and may determine an error prediction parameter based on the predicted error of the first depth map. Here, the image characteristic analysis unit 120 may obtain an error control parameter by combining the analytic parameter and the error prediction parameter.

Also, the image characteristic analysis unit 120 may receive an initial parameter that is set to adjust the first depth map and may determine an ultimate control parameter for adjusting the first depth map, by combining the initial parameter and the error control parameter. Here, at least one of a depth value, an image focus, and a depth range of the first depth map may be adjusted by using parameters such as the analytic parameter, the error prediction parameter, the error control parameter, and the ultimate control parameter.

For example, the image characteristic analysis unit 120 may determine weights for the analytic parameter and the error prediction parameter, and may obtain the error control parameter by calculating a weighted sum of the analytic parameter and the error prediction parameter by using the determined weights.

Also, the image characteristic analysis unit 120 may determine weights for the error control parameter and the initial parameter that is set to adjust the first depth map, and may obtain the ultimate control parameter by calculating a weighted sum of the initial parameter and the error control parameter by using the determined weights.

The depth map adjustment unit 130 receives the first depth map output from the first depth map generation unit 110 and the ultimate control parameter output from the image characteristic analysis unit 120. The depth map adjustment unit 130 adjusts a focal length, a depth value, a depth range, etc. of the first depth map by using the first depth map and the ultimate control parameter.

The depth map adjustment unit 130 may adjust a depth value itself of each region of the first depth map based on the ultimate control parameter determined by the image characteristic analysis unit 120. Also, the depth map adjustment unit 130 may adjust the focal length of the first depth map based on the ultimate control parameter determined by the image characteristic analysis unit 120. According to the adjusted focal length of the first depth map, depths of all objects and a background in left-view and right-view images of a 3D image may be adjusted in the same direction.

The depth map adjustment unit 130 may adjust a depth range between a maximum value and a minimum value of the first depth map based on the ultimate control parameter. For example, if the depth map adjustment unit 130 extends the depth range between the maximum value and the minimum value of the first depth map, a depth map having the adjusted depth range may have a large depth difference between the left-view and right-view images of the 3D image. Otherwise, if the depth map adjustment unit 130 reduces the depth range of the first depth map, the depth map having the adjusted depth range may have a small depth difference between the left-view and right-view images and thus may reduce the error that occurs in the first depth map.

The 3D image generation unit 140 receives the depth map having the adjusted depth range output from the depth map adjustment unit 130 and generates a 3D image of the input image by using the received depth map. A 3D video may be reproduced by using left-view and right-view images of the 3D image generated by the 3D image generation unit 140. The 3D image generation unit 140 may generate a stereoscopic image or a multi-view image.

Figure 1B:
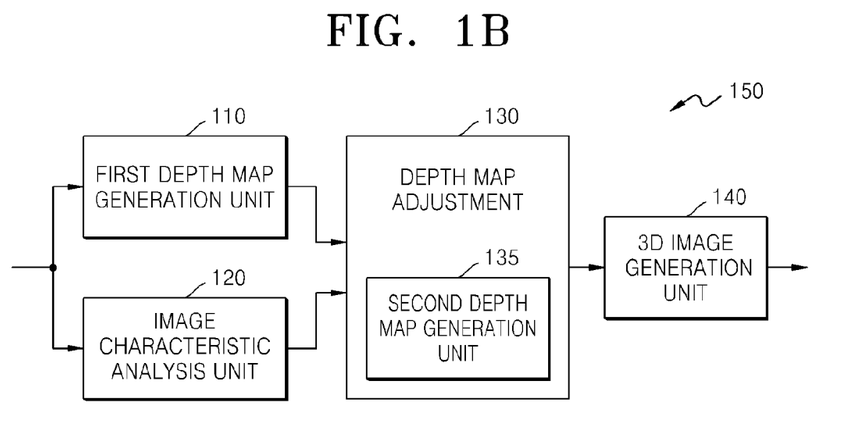
FIG. 1B is a block diagram of an apparatus for converting a 2D image into a 3D image by adjusting a depth of the 3D image, according to another exemplary embodiment.

FIG. 1B is a block diagram of an apparatus 150 for converting a 22D image into a 3D image by adjusting a depth of the 3D image, according to another exemplary embodiment.

The apparatus 150 includes the first depth map generation unit 110, the image characteristic analysis unit 120, the depth map adjustment unit 130, and the 3D image generation unit 140 of the apparatus 100 illustrated in FIG. 1. Furthermore, the depth map adjustment unit 130 includes a second depth map generation unit 135.

The second depth map generation unit 135 receives the first depth map output from the first depth map generation unit 110 and the ultimate control parameter output from the image characteristic analysis unit 120. The second depth map generation unit 135 adjusts a focal length, a depth value, a depth range, etc. of the first depth map by using the first depth map and the ultimate control parameter, and generates a second depth map of the input image.

The second depth map generation unit 135 may adjust a depth value itself of each region of the first depth map based on the ultimate control parameter determined by the image characteristic analysis unit 120. Also, the second depth map generation unit 135 may adjust the focal length of the first depth map based on the ultimate control parameter determined by the image characteristic analysis unit 120. According to the adjusted focal length of the first depth map, depths of all objects and a background in left-view and right-view images of a 3D image may be adjusted in the same direction.

If the image characteristic analysis unit 120 uses the second method of adjusting the first depth map by combining a depth map model and the first depth map, the image characteristic analysis unit 120 may determine a depth map model based on the characteristics of the input image and may adjust the first depth map by using the depth map model. The image characteristic analysis unit 120 may analyze the characteristics of the input image to determine the depth map model of the input image. Also, the image characteristic analysis unit 120 may determine the depth map model based on characteristics of the first depth map.

The image characteristic analysis unit 120 may determine a similarity parameter based on a similarity between the depth map model and the input image. The image characteristic analysis unit 120 may estimate similarities between the first depth map of the input image and a plurality of depth map models included in a depth map model group, may determine a first depth map model having the highest similarity from among the depth map model group, and thus may determine a similarity parameter based on a similarity between the first depth map model and the input image.

The depth map models may be a group of sample images that are predetermined in consideration of at least one of a scene composition according to a camera direction, a density of objects included in the input image, a 3D structure between the objects, a flatness of a background, and a slope of the background in a z-axis direction.

The second depth map generation unit 135 receives the first depth map output from the first depth map generation unit 110 and the similarity parameter output from the image characteristic analysis unit 120. The second depth map generation unit 135 generates the second depth map of the input image by combining the first depth map and the depth map model by using the similarity parameter.

The image characteristic analysis unit 120 may determine a weight for at least one of the depth map model and the first depth map by using the similarity parameter. As such, the second depth map generation unit 135 may generate the second depth map by calculating a weighted sum of the depth map model and the first depth map based on the weight determined by the image characteristic analysis unit 120.

The image characteristic analysis unit 120 may select a predetermined number of depth map models from among the depth map model group in an order of a high similarity to the input image. Also, the image characteristic analysis unit 120 may determine a predetermined number of similarity parameters based on the similarities between the predetermined number of depth map models and the input image. As such, the second depth map generation unit 135 may also generate the second depth map by adjusting the first depth map based on the predetermined number of similarity parameters determined in consideration of the predetermined number of depth map models.

For example, the image characteristic analysis unit 120 may determine similarity parameters of a predetermined number of depth map models having high similarities to the input image and selected from among the depth map model group. Also, the image characteristic analysis unit 120 may determine a weight for calculating a weighted sum on the first depth map in consideration of the similarity parameter of each of the selected depth map models. As such, the second depth map generation unit 135 may generate the second depth map by calculating a weighted sum between the predetermined number of depth map models and the first depth map by using the weights for the predetermined number of depth map models.

The 3D image generation unit 140 receives the second depth map output from the second depth map generation unit 135 and generates a 3D image of the input image by using the second depth map. A 3D video may be reproduced by using left-view and right-view images of the 3D image generated by the 3D image generation unit 140.

The above-described image characteristic analysis unit 120 generates a parameter for adjusting the first depth map and outputs the parameter to the second depth map generation unit 135. According to another exemplary embodiment, the image characteristic analysis unit 120 may generate a parameter to be used in a rendering process using a depth map, based on characteristics of the input image and an error of the first depth map, and may output the parameter to the 3D image generation unit 140. According to another exemplary embodiment, the image characteristic analysis unit 120 may predict an error of the first depth map based on characteristics of the input image, may generate a parameter for directly adjusting a depth map in a depth map estimation process of the first depth map generation unit 110, and thus may output the parameter to the first depth map generation unit 110. As such, the first depth map generation unit 110 may estimate a depth map of the input image by using the parameter input from the image characteristic analysis unit 120.

Figure 2:
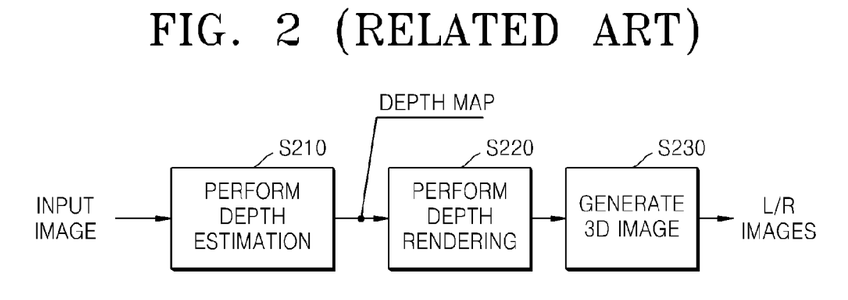
FIG. 2 is a flowchart of a method of converting a 2D image into a 3D image, according to a related art method.

FIG. 2 is a flowchart of a method of converting a 2D image into a 3D image, according to a related art.

According to the related art, a depth of an input image is estimated and thus a depth map is generated in operation S210. Depth rendering is performed by using the depth map, in operation S220, and a 3D image of the input image is generated and left-view and right-view images are output in operation S230.

In a real image, since objects and a background of the image have to be identified and a slope of the background, a density of the objects, etc. are not constant, depths of the background and the objects may be inaccurately estimated. Accordingly, the depth map generated according to the estimated depth of the input image in operation S210 may probably have an error. In order to accurate estimate the depth, various image processing techniques or computer vision techniques may be used to adjust a depth of each frame. However, image processing techniques and computer vision techniques for accurately estimating the depth of the input image generally have a high calculation complexity and thus may not convert a 2D video into a 3D video in real time.

If a 3D image generated by performing depth rendering by using an inaccurately estimated depth map is reproduced, a user may experience inconvenience and may easily be fatigued due to an inappropriate 3D effect of a 3D video.

Figure 3:
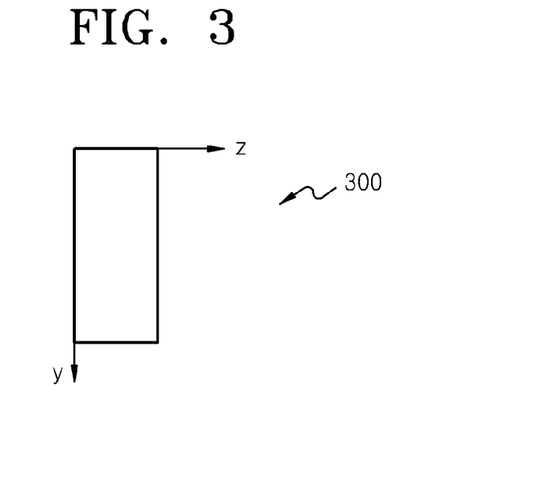
FIGS. 3 and 4 are graphs schematically showing spatial structures from among image characteristics used in the apparatus, examples of which are illustrated in FIG. 1A or 1B, according to an exemplary embodiment.
Figure 4:
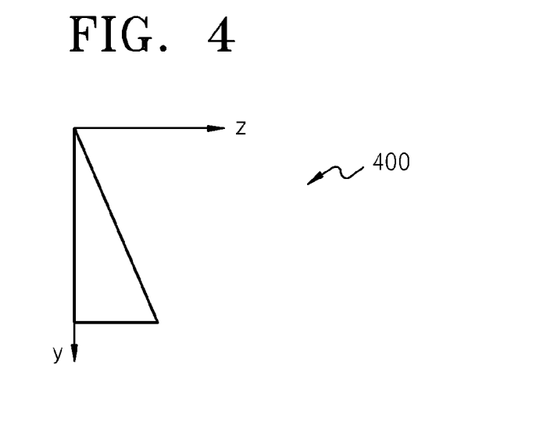

FIGS. 3 and 4 are graphs 300 and 400 schematically showing spatial structures from among image characteristics used in the apparatus 100 or 150 illustrated in FIG. 1A or 1B, according to an exemplary embodiment.

The graph 300 illustrated in FIG. 3 shows a display screen having no slope along a vertical axis, that is, a y-axis direction, of the display screen, and the graph 400 illustrated in FIG. 4 shows a display screen having a slope that is gradually increasing in a z-axis direction along the vertical axis, that is, the y-axis direction, of the display screen. A scene including only subjects located in a narrow and close region, e.g., a home shopping commercial scene, may have the spatial structure illustrated in the graph 300. A scene including subjects in a wide and far region, e.g., a soccer game scene or a landscape scene, may have the spatial structure illustrated in the graph 400.

According to the first method of directly adjusting a parameter for adjusting a first depth map, the image characteristic analysis unit 120 may classify a spatial structure of an input image by analyzing whether the spatial structure according to geometric characteristics of the input image is a flat and slope-less structure as illustrated in the graph 300 or a sloped structure as illustrated in the graph 400. The image characteristic analysis unit 120 may determine an analytic parameter based on the spatial structure.

Also, the image characteristic analysis unit 120 may refer to the spatial structure of the input image in order to determine an error prediction model of the first depth map. For example, if the spatial structure of the input image is analyzed and identified as a slope-less structure, as illustrated in the graph 300, a depth map to be predicted on the input image hardly has a difference in depth along the vertical axis of the display screen. Similarly, if the spatial structure of the input image is analyzed and identified as a sloped structure, as illustrated in the graph 400, the depth map to be predicted on the input image has an increase in depth in the z-axis direction along the vertical axis of the display screen.

As described above, the image characteristic analysis unit 120 may determine the analytic parameter and an error prediction parameter of the first depth map in consideration of the spatial structure of the input image. In addition, the image characteristic analysis unit 120 may further determine analytic parameters in consideration of a temporal structure and a spatio-temporal complexity. An error control parameter for adjusting an original depth map estimated on the input image may be determined based on the various analytic parameters and the error prediction parameter. The second depth map generation unit 135 may generate a second depth map by adjusting the first depth map by using the error control parameter.

Also, the image characteristic analysis unit 120 may store various depth map models according to at least one of a spatial structure, a temporal structure, and a spatio-temporal complexity of an image. That is, depth map models classified according to various image characteristics, e.g., a flat and slope-less depth map as illustrated in the graph 300 and a sloped depth map as illustrated in the graph 400, may be stored in a database of the image characteristic analysis unit 120.

Otherwise, if the image characteristic analysis unit 120 uses the second method of adjusting the first depth map by combining a depth map model and the first depth map, the image characteristic analysis unit 120 may compare the first depth map input from the first depth map generation unit 110 to the depth map models stored in the database and may classify and identify the depth map model of the first depth map. For example, if the input image is a video content of a soccer game, the depth map model of the input image may be identified as illustrated in the graph 400.

The image characteristic analysis unit 120 may determine a weight between the depth map model and the first depth map in consideration of a similarity between the depth map model and the first depth map, and the second depth map generation unit 135 may generate the second depth map by calculating a weighted sum between the depth map model and the first depth map by using the determined weight.

Figure 5:
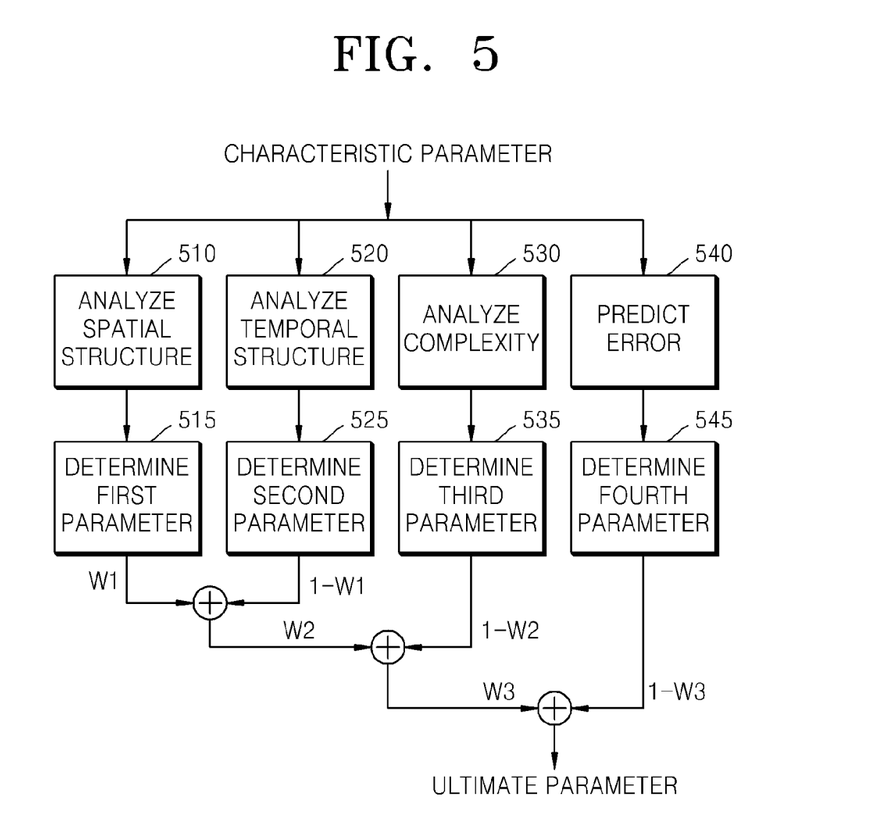
FIG. 5 is a diagram for describing a method of determining a control parameter by using an image characteristic analysis unit, according to an exemplary embodiment.

FIG. 5 is a diagram for describing a method of determining a control parameter by using the image characteristic analysis unit 120, according to an exemplary embodiment.

If the image characteristic analysis unit 120 uses the first method of directly adjusting a parameter for adjusting the first depth map, the image characteristic analysis unit 120 may determine a control parameter for adjusting the first depth map, by using a characteristic parameter of an input image. In this case, the characteristic parameter of the input image may be obtained by an independent digital image processor for directly performing image processing on the input image. Alternatively, a characteristic parameter obtained by a pre-processing unit for performing various types of pre-processing to display a video in a display device such as a 3D TV may be shared. Otherwise, a parameter obtained by a common processor such as a central processing unit (CPU) or a graphic processor unit (GPU) of a display device, a parameter sensed by an external sensor, or various parameters input manually from an external device may be used as the characteristic parameter.

The image characteristic analysis unit 120 may determine the parameter for adjusting the first depth map, by using the characteristic parameter of the input image and based on various characteristics of the input image and a predicted error of the first depth map. The image characteristic analysis unit 120 may analyze a spatial structure of the input image (operation 510) and may determine a first parameter based on the spatial structure (operation 515). For example, in operation 510, a geometric model of the input image may be determined. Examples of a global geometric model of a scene structure may include a close-up shot model, a mid shot model, a long shot model, and an extreme wide shot model.

The image characteristic analysis unit 120 may analyze a temporal structure of the input image (operation 520) and may determine a second parameter based on the temporal structure (operation 525). For example, in operation 520, a motion model of the input image may be determined. Examples of the motion model may include a static model, a panning model, and a zooming model.

The image characteristic analysis unit 120 may analyze a spatio-temporal complexity of the input image (operation 530) and may determine a third parameter based on the spatio-temporal complexity (operation 535). In general, a high spatio-temporal complexity reduces a 3D effect.

Also, the image characteristic analysis unit 120 may predict an error of the first depth map (operation 540) and may determine a fourth parameter, i.e., an error prediction parameter, based on the predicted error (operation 545).

The image characteristic analysis unit 120 may determine weights for at least one analytic parameter and the error prediction parameter. For example, in order to calculate a weighted sum for adjustment between the result of operation 510 and the result of operation 520, a weight w1 for the first parameter and a weight 1-w1 for the second parameter may be determined. Also, in order to calculate a weighted sum for adjustment between the result of operations s510 and s520 and the result of operation 530, a weight w2 for a weighted sum of the first and second parameters and a weight 1-w2 for the third parameter may be determined.

Also, in order to calculate a weighted sum for adjustment between the result of a weighted sum of operations s510, s520, and s530, and the result of operation 540, a weight w3 for a weighted sum of the first through third parameters and a weight 1-w3 for the fourth parameter may be determined. Ultimately, an error control parameter may be determined by calculating a weighted sum of the weight w3 for the weighted sum of the first through third parameters and the weight 1-w3 for the fourth parameter.

If each of the weights w1, w2, and w3 for the analytic parameters and the error prediction parameter is close to a value 0, a contribution of a corresponding parameter for determining the error control parameter may be reduced. Otherwise, if each of the weights w1, w2, and w3 is close to a value 1, the contribution may be increased. For example, if a weight for a predetermined analytic parameter or error prediction parameter has a value 0, the first depth map may be adjusted without consideration of characteristics or error prediction of a corresponding parameter. Otherwise, if the weight has a value 1, the first depth map may be adjusted in consideration of only characteristic or error prediction of the corresponding parameter.

The determined error control parameter may be used according to Equation 1.

$$P'=k \cdot Pi+(1-k) \cdot Pc \qquad \text{Equation 1:}$$

Pi represents an initial control parameter, Pc represents an error control parameter, and k represents a weight. The weight k may be arbitrary set or may be determined for each frame based on image characteristics as in a method of determining the error control parameter Pc. Due to the error control parameter Pc determined based on scene analysis and error analysis of the input image, an ultimate control parameter P' output according to Equation 1 may be determined to adjust the first depth map in consideration of characteristics of the input image and an error of the first depth map. The depth map adjustment unit 130 may adjust the first depth map by using the ultimate control parameter P'. Also, the second depth map generation unit 135 may generate the second depth map for minimizing the error of the first depth map, by using the ultimate control parameter P'.

Figure 6:
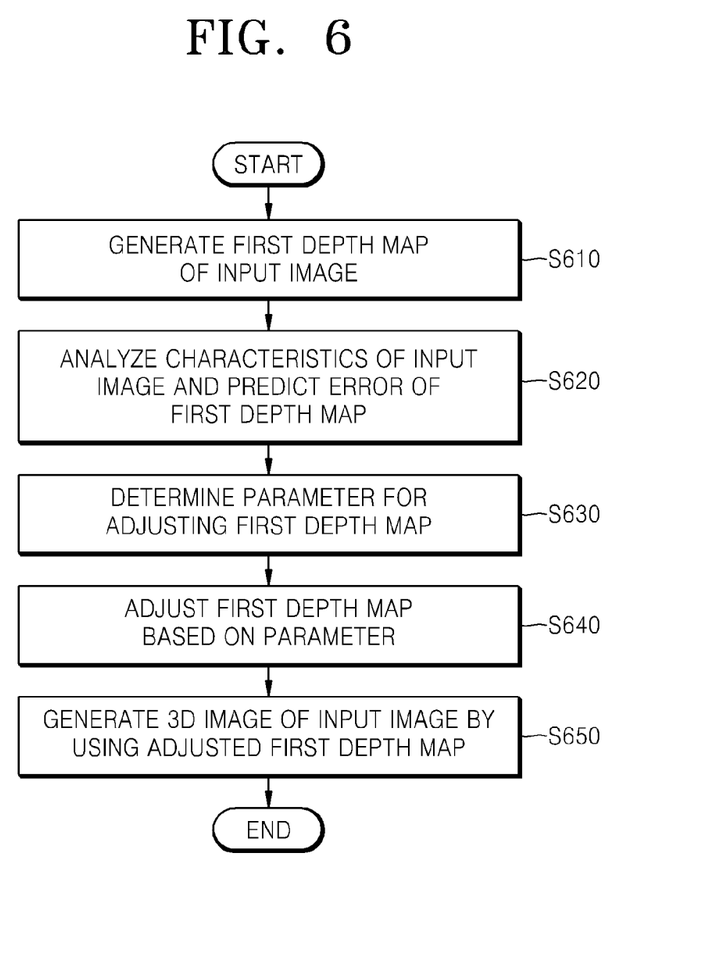
FIG. 6 is a flowchart of a method of converting an image, according to an exemplary embodiment.

FIG. 6 is a flowchart of a method of converting a 2D image into a 3D image by adjusting a depth of the 3D image, according to an exemplary embodiment.

In operation S610, a 2D video is received as an input image and a first depth map is generated by estimating depth information of the input image. Since the input image is formed in a complicated spatial structure and a temporal structure, the directly estimated depth information may probably be inaccurate.

In operation S620, characteristics of the input image are analyzed and an error of the first depth map is predicted. The characteristics of the input image include a spatial structure such as a scene composition, a temporal structure such as a motion model, and a spatio-temporal complexity of the input image. Also, an error of the first depth map, which possibly occurs in the input image, may be predicted based on the characteristics of the input image.

In operation S630, a parameter for adjusting the first depth map is determined based on the analyzed characteristics of the input image and the predicted error of the first depth map. According to an exemplary embodiment, the parameter for adjusting the first depth map may be adjusted. According to another exemplary embodiment, a depth map model of the first depth map may be determined and a parameter for combining the depth map model and the first depth map may be adjusted.

In operation S640, a second depth map of the input image is generated by adjusting the first depth map based on the parameter determined in operation S630. If a control parameter for adjusting the first depth map is determined in operation S630, the second depth map may be generated by using the control parameter. Otherwise, if the depth map model of the first depth map is determined and the weight for combining the depth map model and the first depth map is determined in operation S630, the second depth map may be generated by combining the first depth map and the depth map model to which the weight is applied.

In operation S650, a 3D image of the input image is generated by using the second depth map generated in operation S640. According to an exemplary embodiment, left-view and right-view images may be generated by rendering depth information in consideration of the characteristics of the input image, e.g., the spatial structure, the temporal structure, and the spatio-temporal complexity of the input image, and the predicted error of the directly estimated first depth map, by using the input image and the second depth map.

The exemplary embodiments can be implemented by a processor and/or written as computer programs and can be implemented in general-use digital computers that execute the programs using a computer readable recording medium. Examples of the computer-readable recording medium include magnetic storage media (e.g., ROM, floppy disks, hard disks, etc.), optical recording media (e.g., CD-ROMs, or DVDs), etc.

While exemplary embodiments have been particularly shown and described, it will be understood by one of ordinary skill in the art that various changes in form and details may be made therein without departing from the spirit and scope of the present inventive concept as defined by the following claims. The exemplary embodiments should be considered in a descriptive sense only and not for purposes of limitation.

What is claimed is:

1. A method of converting an image, the method comprising:

generating a first depth map by estimating depth information of a single two-dimensional (2D) image;

analyzing characteristics of the single 2D image by analyzing at least one of a spatial structure, a temporal structure and a spatio-temporal complexity of the single 2D image;

determining at least one analytic parameter based on the at least one of the analyzed spatial structure, the temporal structure and the spatio-temporal complexity of the single 2D image;

predicting an error of the first depth map corresponding to inaccurately estimated depth information of the single 2D image;

determining a parameter for adjusting the first depth map based on the at least one analytic parameter and the predicted error of the first depth map;

adjusting the first depth map based on the determined parameter for adjusting the first depth map; and generating a three-dimensional (3D) image of the single 2D image based on the adjusted first depth map, wherein the determining the parameter for adjusting the first depth map comprises:

determining an error prediction parameter based on the predicted error of the first depth map; and obtaining an error control parameter by combining the analytic parameter and the error prediction parameter, wherein the analyzing the characteristics of the single 2D image further comprises:

determining a depth map model of the single 2D image; and determining a similarity between the depth map model and the single 2D image by analyzing the characteristics of the single 2D image, wherein the predicting the error of the first depth map comprises predicting the error of the first depth map based on the similarity, and wherein the depth map model comprises a sample image.

2. The method of claim 1, further comprising generating a second depth map of the single 2D image based on the adjusted first depth map, wherein the generating the 3D image of the single 2D image comprises generating a stereoscopic image of the single 2D image using the second depth map.

3. The method of claim 1, wherein the analyzing the characteristics of the single 2D image further comprises analyzing at least one of color characteristics, contrast characteristics and edge characteristics of the single 2D image.

4. The method of claim 1, wherein the predicting the error of the first depth map comprises predicting an error in the first depth map based on the characteristics of the single 2D image.

5. The method of claim 1, wherein the determining the parameter for adjusting the first depth map further comprises determining an ultimate control parameter for adjusting the first depth map, wherein the ultimate control parameter is determined by combining the error control parameter and an initial parameter based on characteristics of the first depth map.

6. The method of claim 5, wherein a control parameter comprises at least one of the analytic parameter, the error prediction parameter, the error control parameter and the ultimate control parameter, and has a value for adjusting at least one of a depth value, an image focus and a depth range of the first depth map.

7. The method of claim 5, wherein the determining the ultimate control parameter comprises:

determining weights for the initial parameter and the error control parameter;

obtaining the error control parameter by calculating a weighted sum of the initial parameter and the error control parameter based on the determined weights.

8. The method of claim 1, wherein the obtaining the error control parameter comprises:
   determining weights for the analytic parameter and the error prediction parameter; and
   obtaining the error control parameter by calculating a weighted sum of the analytic parameter and the error prediction parameter based on the determined weights.

9. The method of claim 1, wherein the determining the similarity between the depth map model and the single 2D image comprises:
   estimating similarities between the first depth map of the single 2D image and a plurality of depth map models included in a depth map model group and determining a first depth map model having a highest similarity from among the depth map model group; and
   determining the at least one analytic parameter based on a similarity between the first depth map model and the single 2D image.

10. The method of claim 9, wherein the plurality of depth map models comprise a plurality of sample images.

11. The method of claim 10, wherein the plurality of depth map models are determined based on at least one of a scene composition of the single 2D image, a density of objects included in the single 2D image, a structure between the objects included in the single 2D image, a flatness of a background of the single 2D image, and a slope of the background of the single 2D image in a z-axis direction.

12. The method of claim 1, further comprising:
   determining a weight for at least one of the depth map model and the first depth map based on the determined parameter for adjusting the first depth map; and
   generating a second depth map by calculating a weighted sum of the depth map model and the first depth map based on the determined weight.

13. The method of claim 1, wherein the analyzing the characteristics of the single 2D image further comprises:
   estimating similarities between the first depth map of the single 2D image and a plurality of depth map models included in a depth map model group;
   determining a predetermined number of depth map models in an order of a high similarity to the single 2D image;
   determining a predetermined number of similarity parameters based on the similarities between the predetermined number of depth map models and the single 2D image; and
   generating of a second depth map by adjusting the first depth map based on the predetermined number of determined similarity parameters based on the predetermined number of determined depth map models.

14. An apparatus for converting an image, the apparatus comprising:
   a processor; and
   a storage,
   wherein the processor is configured to execute and the storage stores:
      a first depth map generation unit configured to generate a first depth map by estimating depth information of a single two-dimensional (2D) image;
      an image characteristic analysis unit configured to analyze characteristics of the single 2D image by analyzing at least one of a spatial structure, a temporal structure and a spatio-temporal complexity of the single 2D image, determine at least one analytic parameter based on the at least one of the analyzed spatial structure, the temporal structure, and the spatio-temporal complexity of the single 2D image, predict an error of the first depth map corresponding to inaccurately estimated depth information of the single 2D image, and determine a parameter for adjusting the first depth map, based on the at least one analytic parameter of the single 2D image and the predicted error of the first depth map;
      a depth map adjustment unit configured to adjust the first depth map based on the determined parameter for adjusting the first depth map; and
      a three-dimensional (3D) image generation unit configured to generate a 3D image of the single 2D image based on the adjusted first depth map, and
   wherein the image characteristic analysis unit is further configured to determine an error prediction parameter based on the predicted error of the first depth map, and obtain an error control parameter by combining the analytic parameter and the error prediction parameter,
   wherein the image characteristic analysis unit is further configured to determine a depth map model of the single 2D image, determine a similarity between the depth map model and the single 2D image by analyzing the characteristics of the single 2D image, and predict the error of the first depth map based on the similarity between the depth map model and the single 2D image, and
   wherein the depth map model comprises a sample image.

15. The apparatus of claim 14, wherein the image characteristic analysis unit is further configured to predict the error in the first depth map based on the characteristics of the single 2D image.

16. The apparatus of claim 14, wherein the image characteristic analysis unit is further configured to determine an ultimate control parameter for adjusting the first depth map by combining the error control parameter and an initial parameter based on characteristics of the first depth map.

17. The apparatus of claim 14, wherein the image characteristic analysis unit is further configured to determine weights for the analytic parameter and the error prediction parameter, obtain the error control parameter by calculating a weighted sum of the analytic parameter and the error prediction parameter using the determined weights, determine weights for the initial parameter and the error control parameter, and obtain the error control parameter by calculating a weighted sum of the initial parameter and the error control parameter based on the determined weights.

18. The apparatus of claim 14, wherein the depth map adjustment unit comprises a second depth map generation unit configured to generate a second depth map of the single 2D image by adjusting the first depth map based on the determined parameter for adjusting the first depth map, and
   wherein the 3D image generation unit is further configured to generate and reproduce the 3D image of the single 2D image based on the second depth map.

19. The apparatus of claim 18, wherein the image characteristic analysis unit is further configured to estimate similarities between the first depth map of the single 2D image and a plurality of depth map models included in a depth map model group, determine a first depth map model having a highest similarity from among the depth map model group, and determine the parameter for adjusting the first depth map based on a similarity between the first depth map model and the single 2D image, and
   wherein the second depth map generation unit is further configured to determine weights for the first depth map model and the first depth map based on the determined parameter, and generate the second depth map by calculating a weighted sum of the first depth map model and the first depth map based on the determined weights.

20. A non-transitory computer readable recording medium having recorded thereon a computer program for executing a method of converting an image, the method comprising:

generating a first depth map by estimating depth information of a single two-dimensional (2D) image;

analyzing characteristics of the single 2D image by analyzing at least one of a spatial structure, a temporal structure and a spatio-temporal complexity of the single 2D image;

determining at least one analytic parameter based on the at least one of the analyzed spatial structure, the temporal structure and the spatio-temporal complexity of the single 2D image;

predicting an error of the first depth map corresponding to inaccurately estimated depth information of the single 2D image;

determining a parameter for adjusting the first depth map based on the at least one analytic parameter of the single 2D image and the predicted error of the first depth map;

adjusting the first depth map based on the determined parameter for adjusting the first depth map; and generating a three-dimensional (3D) image of the single 2D image based on the adjusted first depth map, wherein the determining the parameter for adjusting the first depth map comprises:

determining an error prediction parameter based on the predicted error of the first depth map; and obtaining an error control parameter by combining the analytic parameter and the error prediction parameter, wherein the analyzing the characteristics of the single 2D image further comprises:

determining a depth map model of the single 2D image; and determining a similarity between the depth map model and the single 2D image by analyzing the characteristics of the single 2D image, wherein the predicting the error of the first depth map comprises predicting the error of the first depth map based on the similarity, and wherein the depth map model comprises a sample image.

\* \* \* \* \*